United States Patent [19]
Holzman

[11] 3,833,198
[45] Sept. 3, 1974

[54] VEHICLE MIRROR BRACKET ASSEMBLY
[75] Inventor: James W. Holzman, Haycock Twp., Pa.
[73] Assignee: Delbar Products, Inc., Perkasie, Pa.
[22] Filed: Aug. 22, 1973
[21] Appl. No.: 390,500

[52] U.S. Cl. .............................................. 248/476
[51] Int. Cl. ............................................. B60r 1/06
[58] Field of Search........ 248/475 R, 476, 477, 480, 248/484, 485, 486, 487, 488, 289; 350/307

[56] References Cited
UNITED STATES PATENTS
| | | | |
|---|---|---|---|
| 3,259,349 | 7/1966 | Lee | 248/485 X |
| 3,346,229 | 10/1967 | Carson | 248/477 |
| 3,501,123 | 3/1970 | Abromavage et al. | 248/487 |
| 3,667,718 | 6/1972 | Goslin et al. | 248/487 |

Primary Examiner—William H. Schultz
Attorney, Agent, or Firm—Howson and Howson

[57] ABSTRACT

A bracket assembly for rigidly supporting a vehicle rear view mirror of the type having an L-shaped mirror support arm. The mirror is mounted on the outwardly extending horizontal leg of the arm, and the vertical downwardly extending leg of the arm is secured at its lower end to a first bracket member attached to the side of the vehicle and further supported by a second bracket member on the vehicle attached to the arm at a point vertically spaced from the first support member. Means are provided to permit a frictional rotational adjustment of the arm with respect to the bracket members.

3 Claims, 12 Drawing Figures

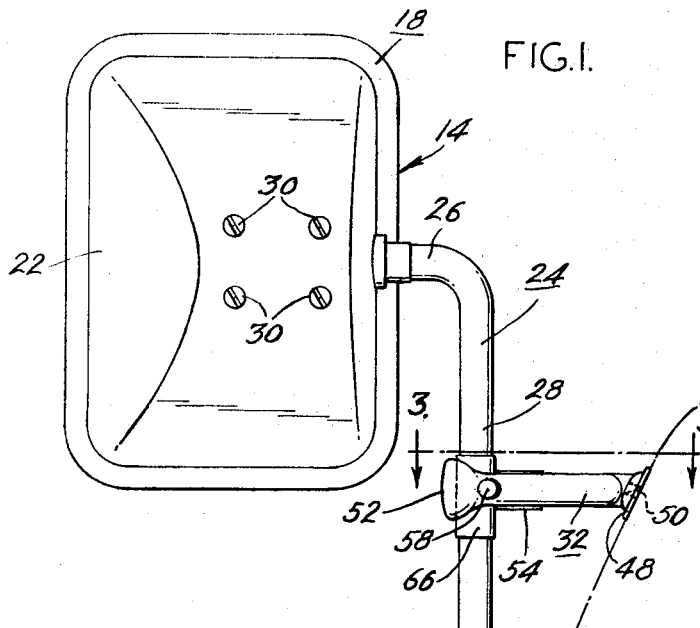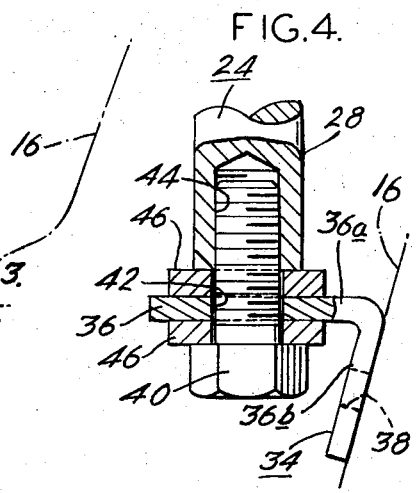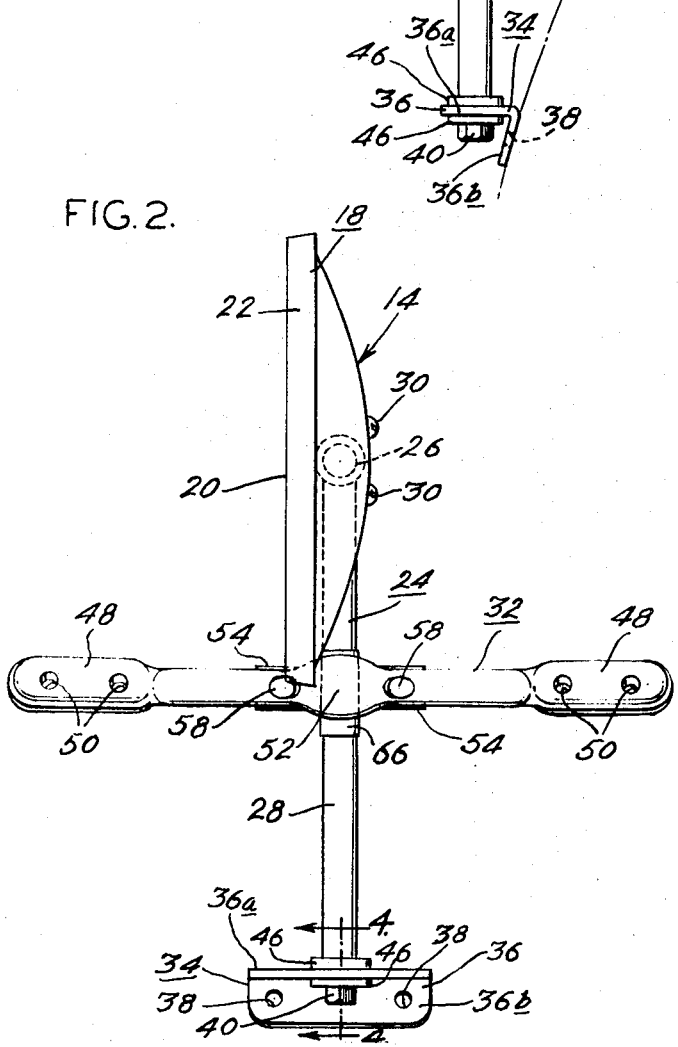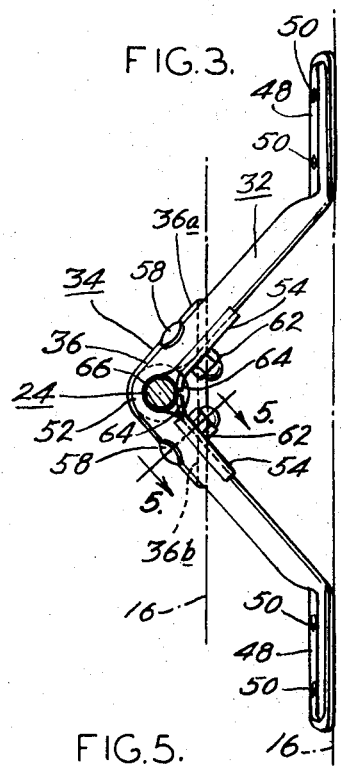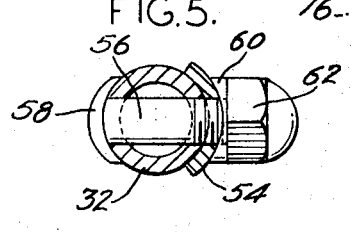

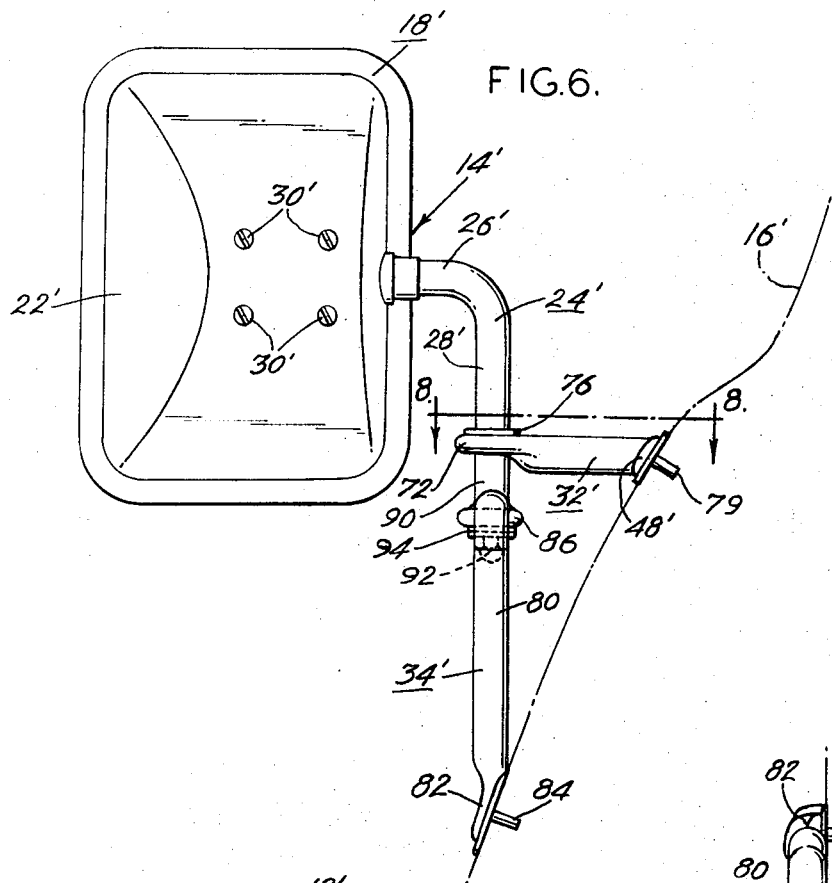

VEHICLE MIRROR BRACKET ASSEMBLY

The present invention relates generally to rear view mirrors for light trucks, vans and similar vehicles, and relates more particularly to a bracket assembly for supporting a below eye-line type mirror in rigid relation with respect to the vehicle.

Since the rearward view of an interiorly mounted mirror would often be obstructed in a light truck or van by the vehicle cargo, a fairly sizable outboard rear view mirror is normally mounted on this type of vehicle as standard equipment. For many years, the accepted style of mirror for this type of vehicle comprised a U-shaped bracket, one end of which mounted above the side window of the vehicle while the other end was attached below the vehicle window. This type of mirror assembly, known as a "Junior West Coast" mirror, featured a rectangular mirror head perpendicularly mounted along the vertical portion of the U-shaped member. Because of its location and size, this style of mirror blocked a substantial portion of the driver's vision out of the side windows of the vehicle and was not an attractive installation.

In recent years, a different style of mirror known as the "below eye-level" mirror has become increasingly popular and generally features a mirror head mounted in cantilever fashion on an L-shaped support arm which is secured to the vehicle door below the vehicle window. A typical example of this type of mirror is shown in U.S. Pat. No. 3,667,718. Although this form of mirror has overcome the principal objection to the earlier style in that visibility is improved, a short-coming of the typical below eye-level mirror is its tendency to vibrate during vehicle movement and to distort the reflected images. The primary cause of this vibration is the manner in which the L-shaped support arm is secured to the vehicle. In the conventional mirror of this type, the lower end of the vertical leg of the L-shaped support arm is threaded and fastened by a nut to the flattened ends of the support brackets. The weight of the cantilever mirror head in addition to that of the L-shaped support arm itself results in a center of mass of the mirror head and support arm which is located a considerable distance from the single point of attachment of the support arm to the bracket elements. As a result, there is an inherent tendency in this conventional mirror construction for the mirror head to vibrate, due principally to the attachment of the support arm at a single point.

The present invention provides a below eye-level mirror which is similar to the conventional mirror in that the cantilevered mirror head is supported by an L-shaped support arm. In the present case, however, the vertical leg of the L-shaped support arm is elongated and secured at two vertically spaced points to bracket members mounted on the side of the vehicle below window level. This arrangement provides a significantly improved mirror performance due to the stiffening effect provided by the spaced arm-supporting brackets. The mirror support arm may be rotationally adjusted to align the mirror for the desired rearward view.

It is accordingly a first object of the present invention to provide a vehicle rear view mirror bracket assembly for below eye-level mirrors which will minimize mirror vibration.

A further object of the invention is to provide a mirror bracket assembly as described which is particularly adapted for use with mirror assemblies comprising an L-shaped mirror support arm, on one end of which the mirror head is mounted in cantilever fashion.

A further object of the invention is to provide a mirror bracket assembly as described which allows rotational adjustment of the L-shaped support arm and the mirror head.

Still another object of the invention is to provide a mirror bracket assembly as described of a simple construction which can be economically manufactured.

Additional objects and advantages of the invention will be more readily apparent from the following detailed description of embodiments thereof when taken together with the accompanying drawings wherein:

FIG. 1 is a front elevational view of a rear view mirror having a bracket assembly in accordance with the present invention;

FIG. 2 is a side elevational view of the mirror assembly shown in FIG. 1;

FIG. 3 is a view partly in section taken along line 3—3 of FIG. 1;

FIG. 4 is an enlarged sectional view taken along line 4—4 of FIG. 2;

FIG. 5 is an enlarged view taken along line 5—5 of FIG. 3;

FIG. 6 is a front elevational view of a rear view mirror having a modified form of bracket assembly in accordance with the present invention;

FIG. 7 is a side elevational view of the mirror assembly shown in FIG. 6;

FIG. 8 is a view partly in section taken along line 8—8 of FIG. 6;

FIG. 9 is an enlarged sectional view taken along line 9—9 of FIG. 7;

Figure 10:
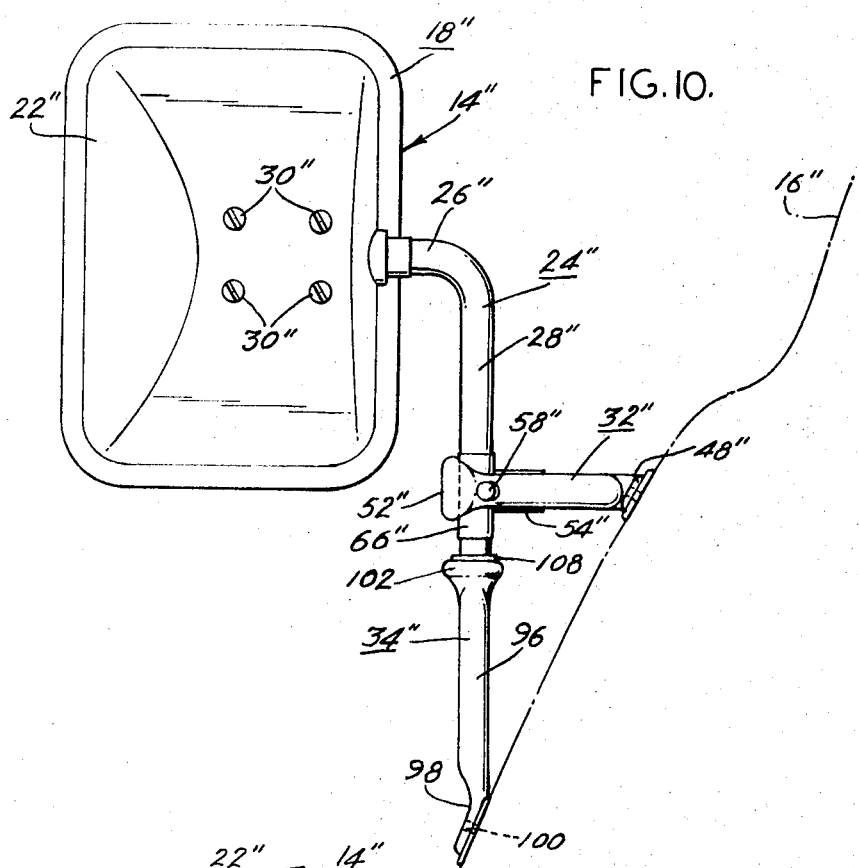
FIG. 10 is a front elevational view of a rear view mirror having a further modified form of bracket assembly in accordance with the present invention.

Referring to the drawings and specifically the embodiment of FIGS. 1–5, a mirror assembly generally designated 14 is shown mounted on the door of a vehicle 16, only the side configuration of which is shown as a broken line in FIG. 1. The mirror assembly 14 includes a mirror head 18 having a reflecting surface 20 of polished metal or glass which is secured within a hollow rectangular casing 22.

The mirror head 18 is mounted in cantilever fashion on an L-shaped support arm 24. The arm 24 includes a horizontal outwardly extending leg 26 and a vertically disposed downwardly extending leg 28. The horizontal leg 26 extends through the side of the casing 22 and passes into the casing to which it is frictionally secured by the tightening of the screws 30. Although the structure of the mirror head and the manner of attachment of the head to the L-shaped form are not a part of the present invention, it is preferred that the mirror head and mounting arrangement be substantially in accordance with that disclosed in my co-pending application Ser. No. 292,998, filed on Sept. 28, 1972.

The L-shaped support arm 24 is securely held with the leg 28 in a vertical disposition adjacent the side of the vehicle 16 by upper and lower bracket members 32 and 34 which are connected to the arm 24 at vertically spaced points. The lower bracket member 34 comprises an angle element 36 having a triangularly shaped horizontal face 36a and an angularly inclined rectangular face 36b parallel to and in engagement with the side of the vehicle 16. Spaced holes 38 in the face 36b permit attachment of the angle element 36 to the vehicle such as by riveting, screws, bolts, etc. As shown in FIG. 4, the bracket member 34 is connected to the lower end of the support arm 24 by means of a screw 40 which passes through a bore 42 in the horizontal face 36a of the angle element 36 and into a threaded bore 44 in the lower end of the arm 24. Washers 46 are disposed around the screw 40 on each side of the angle element 36.

The upper bracket member 32 comprises a tubular member with flattened ends 48 having spaced holes 50 therein to permit attachment of the member to the side of the vehicle by rivets, etc. in the same manner as the bracket member 34. As shown in FIG. 3, the bracket member 32 has a substantially right angled V shape in the horizontal plane and, as illustrated in FIG. 1, is flattened at the apex of the V at 52 where it passes around the arm 24. As shown in FIGS. 1 and 3, the flattened portions 48 are bent both in the horizontal and vertical planes to conform with and lie flat against the side of the vehicle 16. Clamping members 54 having an arcuate cross section are adjustably secured interiorly of the tubular bracket member 32 by bolts 56 having arcuately contoured heads 58, arcuate saddle washers 60, and nut 62. As shown in FIG. 3, the ends 64 of the clamping members 54 extend in a curved manner into tangential engagement with a resilient cylindrical sleeve 66 covering the arm 24 in the region adjacent the upper bracket member 32.

The location of the upper and lower support members 32 and 34 at vertically spaced points on the arm 24 provides a rigidity of the arm not obtainable with the conventional form of bracket wherein the arm is supported only at its lower end. The tendency of the mirror head to vibrate will be accordingly minimized, especially if the mirror head and mounting arrangement disclosed in the above referenced copending application Ser. No. 292,998 is employed.

For use, following installation of the upper and lower bracket members 32 and 34 to the side of the vehicle 16, the arm 24 is pivoted into the desired position and the screw 40 and nuts 62 are tightened to secure the arm in the desired position. Since adjustment of a rear view mirror is periodically necessary to suit the requirements of different drivers, the screw 40 and the nuts 62 are preferably tightened only to the degree necessary to frictionally secure the bar 24 in position while permitting any desired adjustments without the need to loosen the screw and nuts.

A first modified form of the invention is shown in the embodiment of FIGS. 6–9 which while embodying the same concepts as the above-described embodiment, differs in certain details. Since the differences are essentially limited to the mounting brackets and their connection to the L-shaped arm, the discussion of the embodiment will be limited to those features differing from that already described and common elements will be identified with the same numerals with the addtion of a prime suffix.

The embodiment 14' includes the mirror head 18' identical with that previously described and the L-shaped support arm 24' having the horizontal leg 26' to which the mirror head is attached. The vertically disposed leg 28' of the arm 24' is foreshortened and as shown in FIG. 9 terminates in an elongated cylindrical portion 70 of reduced diameter which is threaded at its lower end. The upper support member 32' differs from the support member 32 of the previous embodiment in that the tubular element is horizontally flattened in the region 72 at the apex of its V shape and the flattened region is bored at 74 to receive the portion 70 of the arm 24'. A washer 76 is disposed around the portion 70 between the bracket element 32' and the shoulder 78 of the arm 24'. The flattened ends 48' include studs 79 extending inwardly therefrom for mounting the support member to the vehicle 16'.

The lower bracket member 34' comprises a tubular element 80 of an inverted U-shape, the ends 82 of which are flattened and provided with studs 84. The tubular member 80 is flattened in the region 86 adjacent the center thereof and a bore 88 extends therethrough as shown in FIG. 9 to permit passage of the portion 70 of the arm 24'. A sleeve 90 extending between the flat portion 72 of the upper bracket 32' and the flattened portion 86 of the lower bracket 34' is disposed around the arm portion 70. A nut 92 bearing against washer 94 secures the arm 24' in rigid relation with respect to the upper bracket member 32' and the lower bracket 34', the sleeve 90 being clamped between the two bracket members.

The embodiment of FIGS. 6–9 due to the spaced connection of the upper and lower bracket members to the support arm 24' serves to minimize mirror vibration in the same manner as the previously described embodiment. The addition of the sleeve 90 between the two bracket members provides an additional rigidifying effect since the bracket members are now tied together between their arm support points. The nut 92 is preferably tightened to a degree sufficient to insure the holding of the selected position but permitting a change in the position without the need to loosen the nut 92.

Figure 12:
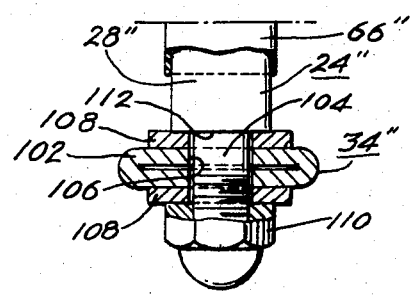
FIG. 12 is an enlarged view partly in section taken along lines 12—12 of FIG. 11.
Figure 11:
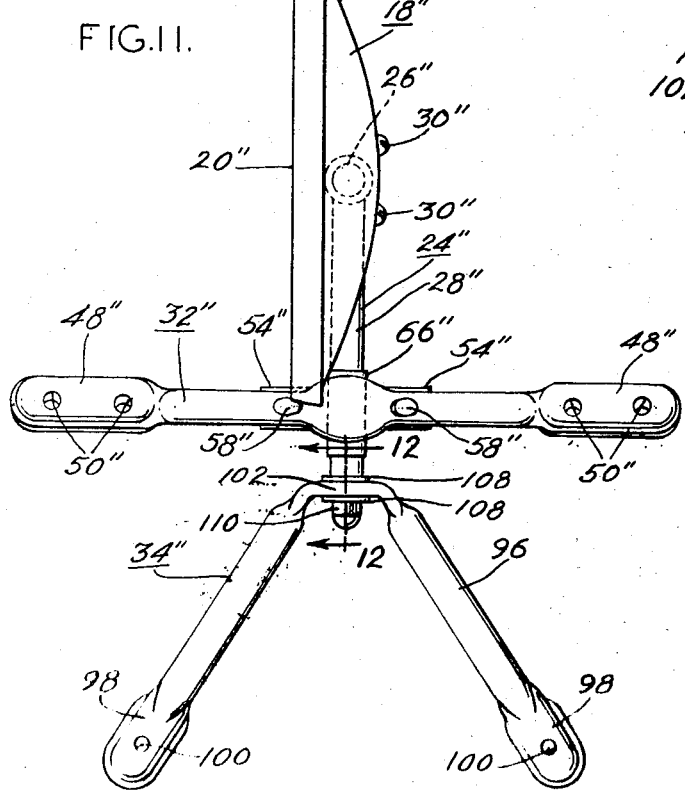
FIG. 11 is a side elevational view of the mirror assembly shown in FIG. 10.

A third embodiment of the invention is shown in FIGS. 10–12 and the elements thereof common with the preceeding two embodiments are designated by the same numerals with a double prime suffix.

The mirror assembly 14" includes a mirror head 18" identical to that of the preceeding two embodiments and a support arm 24" having a horizontal leg 26" connected to the mirror head. The vertical leg 28" of the arm extends downwardly through an upper bracket element 32" identical with the bracket member 32, a resilient sleeve 66" being provided between the bracket member and the arm as in the first described embodiment.

The embodiment of FIGS. 10–12 differs from the embodiment of FIGS. 1–5 in the construction of the lower bracket member 34" and its connection to the lower end of the support arm leg 28". The lower bracket member 34" comprises a tubular element 96 which is bent in an inverted V shape, having flattened ends 98 provided with apertures 100 for attachment of the bracket to the vehicle 16". The region 102 at the apex of the V shape is flattened as shown in FIG. 12 in a horizontal plane and a reduced diameter portion 104 of the arm 24" extends through a bore 106 in the flattened section 102. Washers 108 are disposed around the portion 104 on each side of the flattened section 102 and a nut 110 is tightened on threaded portion 104 to secure the portion against the shoulder 112 of the bar 24". As with the previous embodiments, the nut 110 should be tightened to the degree sufficient to maintain the mirror in rigid position but permit a frictional adjustment of the mirror head by rotation of the arm 24" about its vertical leg.

From the foregoing it can be understood that the present invention may be practiced in several forms, each of which includes the support of the vertical portion of the L-shaped arm at vertically spaced points to achieve the improved rigidity which minimizes mirror vibration.

Each of the illustrated embodiments is characterized by a relatively simple economically manufactured construction which can be readily adapted to any vehicle configuration. The improved performance of the mirror especially when combined with the mirror head and mounting arrangement of my co-pending application Ser. No. 292,998, will significantly improve the rearward vision of the driver and accordingly contribute to highway safety.

Manifestly, changes in details of construction can be effected by those skilled in the art without departing from the spirit and the scope of the invention.

I claim:

1. A vehicle rear view mirror comprising a mirror head, an L-shaped support arm having a horizontal leg and a downwardly extending vertical leg, means mounting said mirror head to the horizontal leg of said support arm, upper and lower bracket members adapted for attachment at spaced points to a vehicle, said upper bracket member comprising a tubular V-shaped member extending horizontally from said vehicle with the apex of said V-shaped member connected to said support arm vertical leg, the ends of said V-shaped member being flattened and bent to conform to the vehicle body for attachment thereto, said V-shaped member being flattened vertically in the apex region thereof and bent tangentially around said support arm vertical leg, and clamping means for securing said support arm vertical leg against the flattened apex portion of said upper bracket member, said bracket members being connected to said support arm vertical leg at vertically spaced points thereon to rigidly secure said support arm and mirror head to a vehicle.

2. The invention as claimed in claim 1 wherein said clamping means comprises a clamping member on said upper bracket engaging said support arm vertical leg, and means for adjusting the engagement of said clamping member with said vertical leg.

3. A vehicle rear view mirror comprising a mirror head, an L-shaped support arm having a horizontal leg and a downwardly extending vertical leg, means mounting said mirror head to the horizontal leg of said support arm, upper and lower bracket members adapted for attachment at spaced points to a vehicle, said upper bracket member comprising a V-shaped member extending horizontally from said vehicle with the apex of said V-shaped member connected to said support arm vertical leg, said lower bracket member comprising an angle element having a horizontal face and an angularly inclined face, the inclined face of said element being adapted for attachment to a vehicle body, said lower end of said support arm vertical leg including a threaded bore, a bore in the horizontal face of said angle element, a screw passing through said angle element bore into said support arm threaded bore for securing the lower end of said support arm vertical leg to said angle element, said bracket members being connected to said support arm vertical leg at vertically spaced points thereon to rigidly secure said support arm and mirror head to a vehicle.

* * * * *